(12) United States Patent
Belagal Math et al.

(10) Patent No.: US 11,231,762 B2
(45) Date of Patent: Jan. 25, 2022

(54) CONTENT ADAPTIVE DISPLAY POWER SAVINGS SYSTEMS AND METHODS

(71) Applicant: Intel Corporation, Santa Clara, CA (US)

(72) Inventors: Shravan Kumar Belagal Math, Bangalore (IN); Tamoghna Ghosh, Bangalore (IN); Sherine Abdelhak, Beaverton, OR (US); Junhai Qiu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/135,292

(22) Filed: Dec. 28, 2020

(65) Prior Publication Data

US 2021/0191489 A1 Jun. 24, 2021

Related U.S. Application Data

(63) Continuation of application No. 16/593,849, filed on Oct. 4, 2019, now Pat. No. 10,877,540.

(51) Int. Cl.
*G06F 1/32* (2019.01)
*G06F 1/3203* (2019.01)
*G09G 3/20* (2006.01)

(52) U.S. Cl.
CPC .............. *G06F 1/3203* (2013.01); *G09G 3/20* (2013.01); *G09G 2320/0613* (2013.01); *G09G 2330/023* (2013.01)

(58) Field of Classification Search
CPC .... G06F 1/3203; G06F 1/3218; G06F 1/3265; G09G 2320/0271; G09G 2320/0613;

(Continued)

(56) References Cited

U.S. PATENT DOCUMENTS 9,648,569 B2 * 5/2017 Madan ................ H04W 52/146
9,860,852 B2 * 1/2018 Madan ................ H04B 17/309
(Continued)

FOREIGN PATENT DOCUMENTS

WO 2018138597 8/2018

OTHER PUBLICATIONS

Timofte et al., "DIV2K dataset: Diverse 2K resolution high quality images as used for the challenged @NTIRE," downloaded from https://data.vision.ee.ethz.ch/cv1 DIV2K on Apr. 23, 2020, 6 pages.
(Continued)

*Primary Examiner* — Tony O Davis
(74) *Attorney, Agent, or Firm* — Hanley, Flight & Zimmerman, LLC

(57) ABSTRACT

The present disclosure is directed to systems and methods for reducing display image power consumption while maintaining a consistent, objectively measurable, level of image distortion that comports with a display image quality metric. Raw image data is converted to an HSV format. "V" values are extracted from the HSV format raw image data and a histogram generates a plurality of "V" values. HSV format raw image data is provided to at least one layer of a trained CNN to extract a plurality of features. The plurality of "V" values and the plurality of features are provided to an AI circuit to generate a plurality of distortion class value pairs. Each of the distortion class value pairs is weighted based on proximity of display image distortion and the display image quality metric. The distortion class pair providing a display image distortion close to the display image quality metric is applied to the raw image data to generate the display image data.

19 Claims, 9 Drawing Sheets

(58) Field of Classification Search
CPC ....... G09G 2320/062; G09G 2330/021; G09G 2330/023; G09G 2340/06; G09G 2360/16; G09G 3/20; G09G 3/3406; G09G 5/005; G09G 5/02; G09G 5/026; Y02D 10/00
USPC .......................................... 345/156, 690–696
See application file for complete search history.

(56) References Cited

U.S. PATENT DOCUMENTS

| | | |
|---|---|---|
| 10,877,540 B2 | 12/2020 | Belagal Math et al. |
| 2008/0204396 A1 | 8/2008 | Otome |
| 2015/0363944 A1 | 12/2015 | Elliott et al. |
| 2016/0284315 A1 | 9/2016 | Zhang |
| 2016/0358321 A1 | 12/2016 | Xu et al. |
| 2016/0373960 A1* | 12/2016 | Saunders ................ H04L 43/16 |
| 2018/0323904 A1* | 11/2018 | Hosokawa ........... H04B 10/118 |
| 2019/0392122 A1* | 12/2019 | Foster .................... G06N 20/00 |
| 2019/0392128 A1* | 12/2019 | Conde .................. G06N 3/0454 |
| 2020/0012924 A1* | 1/2020 | Ma ......................... G06N 3/049 |
| 2020/0033930 A1 | 1/2020 | Belagal Math et al. |
| 2020/0099409 A1* | 3/2020 | Nguyen ................ H04B 1/123 |
| 2020/0202213 A1* | 6/2020 | Darvish Rouhani ... H03M 7/24 |
| 2020/0302225 A1* | 9/2020 | Dutta ..................... G06K 9/036 |
| 2021/0149465 A1* | 5/2021 | Hiltner ...................... G06F 1/26 |
| 2021/0150660 A1* | 5/2021 | An ........................ G06T 7/0002 |
| 2021/0209787 A1* | 7/2021 | Kim ..................... G06K 9/6267 |
| 2021/0264147 A1* | 8/2021 | Kadambi ............... G06K 9/627 |

OTHER PUBLICATIONS

Agustsson et al., "NTIRE 2017 Challenge on Single Image Super-Resolution: Dataset and Study", 2017 IEEE Conference on Computer Vision and Pattern Recognition Workshops (CVPRW), Honolulu, HI, 2017, 10 pages.

United States Patent and Trademark Office, "Corrected Notice of Allowability," issued in connection with U.S. Appl. No. 16/593,849, dated Oct. 15, 2020, 5 pages.

United States Patent and Trademark Office, "Notice of Allowance," issued in connection with U.S. Appl. No. 16/593,849, dated Aug. 19, 2020, 11 pages.

International Searching Authority, "Search Report and Written Opinion," issued in connected with PCT Application No. PCT/US2020/053998, dated Jan. 28, 2021, 8 pages.

* cited by examiner

CONTENT ADAPTIVE DISPLAY POWER SAVINGS SYSTEMS AND METHODS

RELATED APPLICATION

This patent arises from a continuation of U.S. application Ser. No. 16/593,849 (now U.S. Pat. No. 10,877,540), titled "Content Adaptive Display Power Savings Systems and Methods," filed Oct. 4, 2019, which is incorporated herein by this reference in its entirety.

TECHNICAL FIELD

The present disclosure relates to display devices, specifically display devices having power saving features.

BACKGROUND

Modern display devices, particularly liquid crystal display (LCD) devices and light emitting diode (LED) devices rely upon a back-light supplying fairly intense back-illumination to a color panel to produce visible output. The power consumed by such back-lights is considerable, often as much as 20-25% of the total power consumption of the device. This is particularly power consumption for handheld and portable devices such as smartphones, tablet computers, laptop computers, wearable computers, and similar portable processor-based devices. A class of power saving technologies includes selectively limiting the power consumption of display backlights. Such power saving technologies, while somewhat effective typically compromise the quality of the display image since each reduction in luminous output causes distortion of a percentage of picture elements (pixels) comprising the display image.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
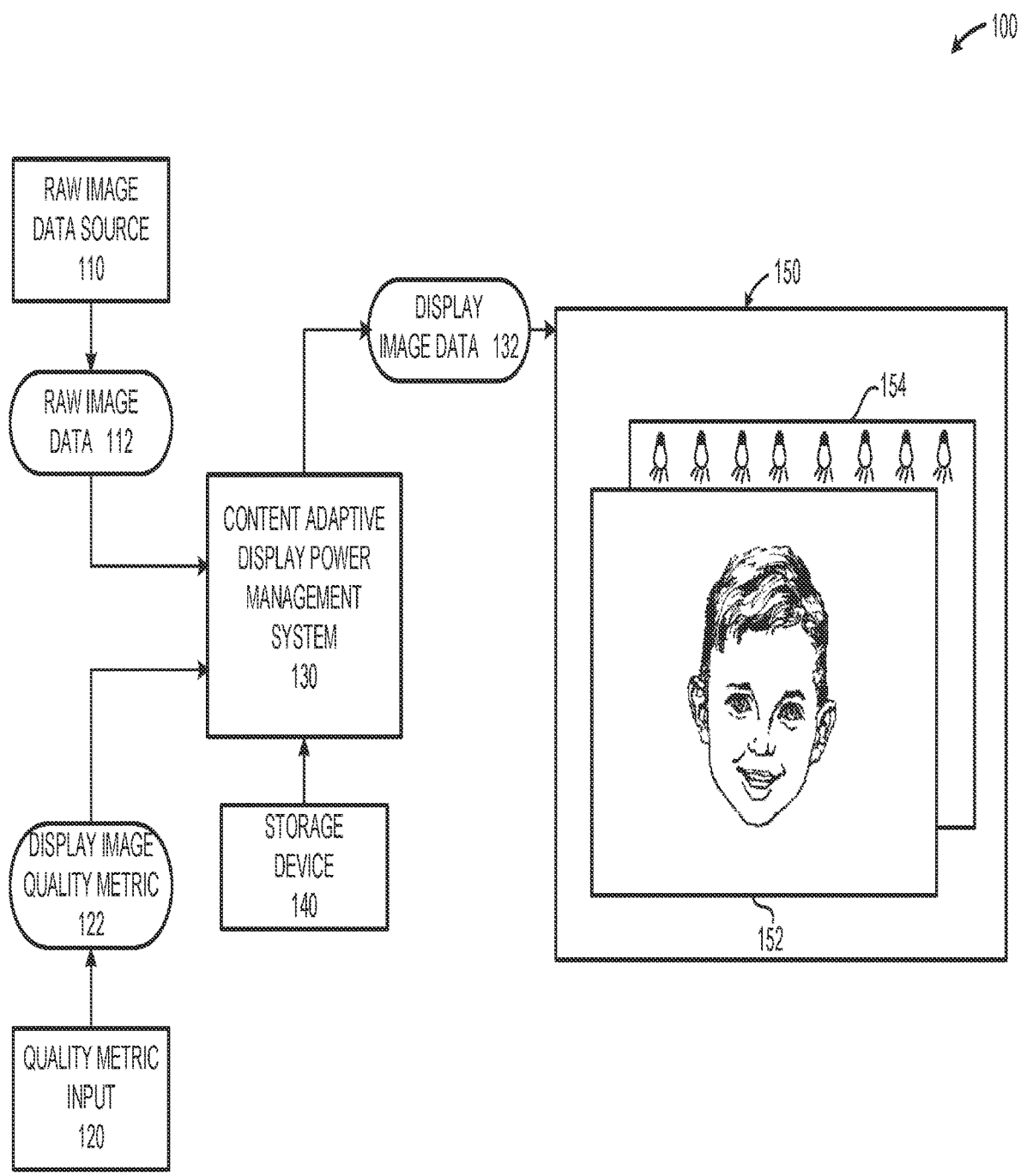
FIG. 1 is a block diagram that depicts an illustrative system that includes a content adaptive display power management system to receive raw image data and a display image quality metric used to generate transformed image data for display by one or more display devices, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Backlit displays, such as LCD displays, include a pixel array illuminated by a backlight to produce a visible image. Each of the pixels included in the display may be assigned a specific color using a representation such as a hue, saturation, and value (HSV). Using HSV, color of each pixel is defined by the hue ("H") percentage and saturation ("S") value associated with the pixel and the brightness/darkness of the pixel is determined by the value "V."

One technique to reduce backlight power consumption is by decreasing backlight brightness while adjusting pixel color values by a factor to compensate for the diminished backlight brightness. If the same factor is applied universally across all pixels, the image quality remains unchanged. To increase power savings, the factor applied to each pixel or pixel group in the display may be individually determined. The use of variable pixel adjustment factors across the display however introduces a degree of distortion into the display image.

The systems and methods disclosed herein beneficially improve backlight power savings by maintaining the display image quality provided by variable pixel adjustment factors as close as possible to a defined subjective image quality score, such as Video Multimethod Assessment Fusion (VMAF). The systems and methods disclosed herein accept a subjective allowable image quality score as an input that, along with raw image data, is used to then determine a distortion class pair that is provides display power savings while maintaining an acceptable image quality as determined by the subjective image quality score.

One method of conserving display power is accomplished by increasing pixel intensity values while simultaneously or concurrently reducing backlight brightness. Typically, such power saving systems offer a finite number of power saving levels with the degree of power savings dependent on the operating level. Each of these levels may be defined or characterized by the percentage of pixels considered as "white" pixels and the degree of distortion of the "white"

pixels. Graphically, the percentage of white pixels included in the transformed image data defines an inflection point and a slope of a line segment through the inflection point defines the degree of distortion applied to the white pixels in the transformed image data. Together, the inflection point and the slope of the line segment determine the overall power savings achieved. While prior implementations have relied upon predefined static parameters to select the percentage and slope and thus provide a power savings in the absence of a subjective measure of the degree of distortion of the display image, the systems and methods disclosed herein beneficially and advantageously select the percentage and line segment slope that offers a display power savings while maintaining a transformed display image quality measured using one or more manually or autonomously selected subjective image quality metric.

The systems and methods disclosed herein beneficially concentrate the subjective score of the transformed display image close to input subjective score, thereby providing greater consistency in user experience. The systems and methods disclosed herein may be beneficially expanded to cover display devices having multiple display segments, each with one or more backlight devices, by maintaining a substantially uniform transformed subjective image score across all of the display segments. The systems and methods disclosed herein beneficially allow user entry of a desired transformed image quality/power savings, thereby providing a predictable user experience.

The systems and methods disclosed herein convert raw image pixel data into a hue, saturation, and value (HSV) representation. The HSV representation is provided to a single-layer object detection convolutional neural network (CNN) and the resulting output data is reduced, for example via MaxPooling, to provide a defined number (e.g., 64) output values. The HSV representation is also provided to an extraction circuit where the "V" values are extracted and a histogram having a defined number (e.g., 64) of "V" value buckets generated. The output values from the CNN and the V-histogram values are provided as an input to a trained artificial intelligence circuit. The AI circuit may be trained to provide outputs at a plurality of subjective image quality scores. Thus, for any defined manually or autonomously selected subjective transformed image quality metric, the AI circuit generates a distortion class pair that defines the percentage and segment slope that provides the greatest display power savings while maintaining the selected image quality. At times, the AI circuitry may output a plurality of distortion class pair values. Each of the distortion class pair values may be assigned a weight and based upon the deviation of the transformed image quality from the raw image quality as measured using the subjective image quality metric. The selected distortion class pair value is applied to the raw image data to generate the transformed image data that is then provided to a communicatively coupled display device.

Content adaptive display power reduction circuitry is provided. The content adaptive display power reduction circuitry may include: at least one input/output (I/O) interface to: receive raw image data; and receive at least one input that includes data indicative of an objective display image quality metric; artificial intelligence circuitry to generate an output that includes a plurality of distortion class value pairs determined using data obtained from the received raw image data; selection circuitry to select one of the distortion class value pairs included in the plurality of distortion class value pairs, the selection based on a respective level of distortion introduced to the raw image data by application of each of the plurality of distortion class value pairs and the objective display image quality metric; and image transformation circuitry to apply the selected distortion class value pair to the received raw image data to generate display image data.

A content adaptive display power reduction method is provided. The method may include: receiving, via at least one input/output (I/O) interface, data representative of a raw image and data indicative of an objective display image quality metric; generating, by artificial intelligence circuitry, a plurality of distortion class value pairs determined using data obtained from the received raw image data; selecting, by selection circuitry, one of the distortion class value pairs included in the plurality of distortion class value pairs, the selection based on a respective level of distortion introduced to the raw image data by application of each of the plurality of distortion class value pairs and the objective display image quality metric; and applying, by image transformation circuitry, the selected distortion class value pair to the received raw image data to generate display image data.

A non-transitory storage device that includes instructions is provided. The instructions, when executed by a content adaptive display power reduction control circuit, cause the control circuit to: cause artificial intelligence circuitry to generate a plurality of distortion class value pairs using raw image data; cause selection circuitry to select one of the distortion class value pairs included in the plurality of distortion class value pairs, the selection based on a respective level of distortion introduced to the raw image data by application of each of the plurality of distortion class value pairs and an objective display image quality metric; and cause image transformation circuitry to apply the selected distortion class value pair to the received raw image data to generate display image data.

A content adaptive display power reduction system is provided. The system may include: means for receiving data representative of a raw image and data indicative of an allowable image distortion value; means for generating a plurality of distortion class value pairs determined using data obtained from the received raw image data; means for selecting one of the distortion class value pairs included in the plurality of distortion class value pairs, the selection based on a respective level of distortion introduced to the raw image data by application of each of the plurality of distortion class value pairs and the objective display image quality metric; and means for applying the selected distortion class value pair to the received raw image data to generate display image data.

An electronic device is provided. The electronic device may include: processor circuitry; at least one display device; and content adaptive display power reduction circuitry coupled to the processor circuitry and the display device, the content adaptive display power reduction circuitry, including: at least one input/output (I/O) interface to: receive raw image data; and receive at least one input that includes data indicative of an objective video quality metric; artificial intelligence circuitry to generate an output that includes a plurality of distortion class value pairs determined using data obtained from the received raw image data; selection circuitry to select one of the distortion class value pairs included in the plurality of distortion class value pairs, the selection based on a respective level of distortion introduced to the raw image data by application of each of the plurality of distortion class value pairs and the objective display image quality metric; and image transformation circuitry to apply the selected distortion class value pair to the received raw image data to generate display image data.

As used herein, the term "on-chip" or elements, components, systems, circuitry, or devices referred to as "on-chip" include such items integrally fabricated with the processor circuitry (e.g., a central processing unit, or CPU, in which the "on-chip" components are included, integrally formed, and/or provided by CPU circuitry) or included as separate components formed as a portion of a multi-chip module (MCM) or system-on-chip (SoC).

FIG. 1 is a block diagram that depicts an illustrative system that includes a content adaptive display power management system 130 to receive raw image data 112 and a display image quality metric 122 used to generate transformed image data 132 for display by one or more display devices 150, in accordance with at least one embodiment described herein. As depicted in FIG. 1, in embodiments, a raw image data source 110 provides the raw image data 112 to the content adaptive display power management system 130 and a manually entered or autonomously generated image quality metric input 120 provides the transformed image quality metric data 122 to the content adaptive display power management system 130. Using the received raw image data 112 and the received transformed image quality metric data 122, circuitry within the content adaptive display power management system 130 generates an output that includes data indicative of an allowable percentage of distorted pixels and data indicative of the degree of distortion of the pixels in the transformed image data 132. Beneficially, in embodiments, the content adaptive display power management system 130 generates transformed image data 132 having an objectively measurable image quality. For example, the content adaptive display power management system 130 may generate transformed image data 132 having a distortion from the raw image data 112 objectively measurable using the Video Multimethod Assessment Fusion (VMAF) quality metric. The use of such objective quality metric measurements improves user experience over prior systems and methods that provided display power management by distorting the display image in a manner that did not incorporate an objective measure of distorted image quality. Advantageously, the use of an objectively measurable image quality metric may improve overall user experience by providing a consistent and predictable display image.

In operation, the content adaptive display power management system 130 receives raw image data 112 generated by a raw image data source 110 and a display image quality metric 122 indicative of a desired level of display image quality from an input quality metric source 120. In embodiments, the display image quality metric 122 may be manually entered, for example via a user interface. In other embodiments, the display image quality metric 122 may be autonomously generated by the host device of the content adaptive display power management system 130. Using the received raw image data 112 and the received display image quality metric 122, the content adaptive display power management system 130 generates the display image data 132. Beneficially, the display image data 132 provides the greatest possible display device power savings while concurrently maintaining a consistent display image quality at an objectively measurable level.

In embodiments, the content adaptive display power management system 130 reduces the power consumption of one or more backlight systems 154 disposed in the display device 150 while simultaneously distorting the output of a percentage of the pixels forming the display image 152. The combination of reduced backlight brightness and distorted pixel output alters or distorts the display image provided by the display image data 132 when compared to the raw image data 112 as received by the content adaptive display power management system 130. The distortion present in the display image data 132 is measured using a standard image quality metric, such as VMAF to quantify and assign an objective value representative of the overall level of distortion present in the display image data 132. The objective value representative of the overall level of distortion present in the display image data 132 is compared to the display image quality metric 122 such that the distortion present in the display image data 132 is at or near the display image quality metric 122. Thus, the reduction in backlight brightness reduces the power consumption of the display device 150 while maintaining the objective value representative of the overall level of distortion present in the display image data 132 at or near the display image quality metric 122 provides a more consistent and predictable user environment.

The raw image data source 110 may include any number and/or combination of currently available and/or future developed devices or systems capable of forwarding, producing, providing, or otherwise generating raw image data. In embodiments, the raw image data source 110 may include a central processing unit (CPU); graphics processing unit (GPU); or a digital signal processor (DSP) disposed in a processor-based electronic device such as a smartphone, wearable computer, portable computer, laptop computer, desktop computer, or server. In embodiments, the raw image data source may include but is not limited to a still image data source or a video data source. The raw image data 112 provided or generated by the raw image data source 110 may be in any currently available or future developed format and or coding. In at least some embodiments, the raw image data 112 may include images encoded using any currently available and/or future developed encoding format. Example raw image data 112 encoding formats include but are not limited to: JPEG; GIF; MPEG; MP3; MP4; and similar. In embodiments, the raw image data 112 may include Red/Green/Blue (RGB) data for each of a plurality of picture elements or pixels. In embodiments, the raw image data 112 may include information and/or data for a display image having any resolution. For example, the raw image data 112 may include information and/or data for a display image having a resolution of: 640×480; 1280×720; 1440×1080; 1920×1080; 3840×2160; 7680×4320; and 15360×8640

The quality metric input 120 may include one or more interfaces to receive information and/or data representative of the display image quality metric 122. In embodiments, the display image quality metric 122 may be manually entered by a system user, for example via a user interface such as a touchscreen or soft or hard keyboard. In embodiments the display image quality metric 122 may be autonomously generated by the host device of the content adaptive display power management system 130. In at least some embodiments, display image quality metric 122 may include Video Multimethod Assessment Fusion (VMAF) video quality metric having a range of 0 (worst distortion) to 100 (total fidelity between transformed and raw image). One of ordinary skill in the relevant arts will readily appreciate that VMAF may be replaced using any objective image distortion assessment metric without compromising the performance of the content adaptive display power management system 130.

The content adaptive display power management system 130 includes any number of currently available and/or future developed electronic components, semiconductor devices, optical devices, and/or logic elements capable of generating the display image data 132 using the received raw image data 112 and the display image quality metric 122. In embodiments, the content adaptive display power management system 130 may include artificial intelligence circuitry, such as convolutional neural network (CNN) circuitry that has been trained to generate a data output that includes information and/or data representative of a percentage of distorted pixels and the degree of distortion of the pixels in the display image data 132. In embodiments, the content adaptive display power management system 130 may combine the information and/or data representative of a percentage of distorted pixels and the degree of distortion of the pixels with the received raw image data 112 to produce or otherwise generate the display image data 132. In embodiments, the content adaptive display power management system 130 may compare the distortion present in the display image data 132 with the raw image data 112 to generate one or more quantitative, objective, distortion metrics for comparison with the display image quality metric 122. Thus, the content adaptive display power management system 130 generates display image data 132 having a quantitatively measurable, consistent, and predictable level of distortion, thereby enhancing the user experience while reducing power consumption of the display device 150.

The storage device 140 may include any number and/or combination of devices capable of storing information and/or data including one or more machine-readable and/or processor-executable instruction sets. In embodiments, the storage device 140 may include one or more data stores, data structures, or databases, that store or otherwise retain information and/or data representative of: one or more neural network models having an input layer that accepts raw image data 112 and an output layer that provides display image data 132 having a percentage of distorted pixels when compared with the raw image data 112. In embodiments, the input layer of the one or more neural network models may accept the display image quality metric 122. In such embodiments, the one or more neural network models may selectively provide an output that includes display image data 132 having a percentage of distorted pixels such that an objective image quality metric, such as the VMAF image quality metric, is at or near the received display image quality metric 122. In other embodiments, the storage device 140 may include a plurality of neural network models with each of the plurality of neural network models configured to generate display image data 132 having a defined image quality metric that is at or near the received display image quality metric 122.

The display device 150 may include any number and/or combination of electronic components, semiconductor devices, optical devices, and/or logic elements capable of providing a human perceptible, visual, output. In embodiments, the display device 150 may include one or more touchscreen devices that provide a tactile input as well as a video or visual output. In embodiments, the display device 150 includes one or more display outputs 152 and/or one or more backlight circuits 154 capable of generating a variable electromagnetic output. The display device 150 may be disposed in a smartphone, portable computer, wearable computer, tablet computer, laptop computer or netbook. The display device 150 may use any currently available or future developed display technology, such as liquid crystal display (LCD) display technology; light emitting diode (LED) display technology; quantum dot LED (QLED) display technology; polymer LED (PLED) display technology; and similar. The display device 150 may have any display resolution, including but not limited to: 4:3 aspect ratio resolutions (640×480, 800×600, 960×720, 1024×768, 1280×960, 1400×1050, 1440×1080, 1600×1200, 1856×1392, 1920×1440, 2048×1536, etc.); 16:10 aspect ratio resolutions (200×800, 1440×900, 1680×1050, 1920×1200, 2560×1600, etc.); or any other aspect ratios and/or display resolutions. In embodiments, the display device 150 includes one or more I/O interfaces to receive the display image data 132 from the content adaptive display power management system 130.

Figure 2:
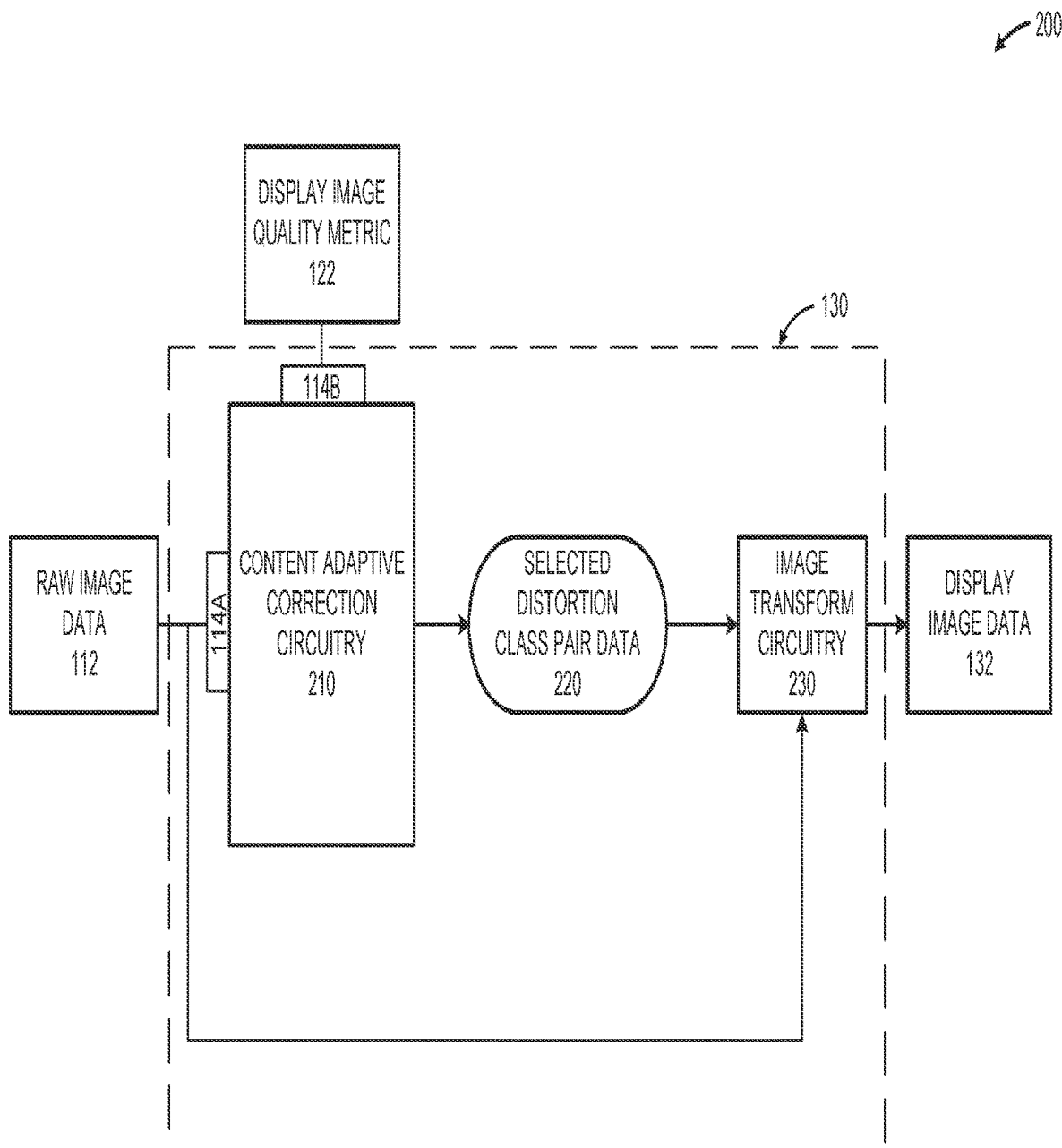
FIG. 2 is a block diagram that depicts an illustrative content adaptive display power management system that includes content adaptive correction circuitry that receives the raw image data and the display image quality metric and outputs distortion class pair data, in accordance with at least one embodiment described herein.

FIG. 2 is a block diagram that depicts an illustrative content adaptive display power management system 100 that includes content adaptive correction circuitry 210 that receives the raw image data 120 and the display image quality metric 122 and outputs distortion class pair data 220, in accordance with at least one embodiment described herein. In embodiments, the distortion class pair data 220 includes information and/or data representative of the percentage of allowable distorted pixels and the permissible degree of distortion of the pixels in the display device 154 needed to provide a display image at or near the display image quality metric 122 while simultaneously providing the greatest possible display power savings. In embodiments, image transformation circuitry 230 uses the distortion class pair data 220 and the raw image data 112 to generate the display image data 132.

In embodiments, the content adaptive correction circuitry 210 includes one or more interface circuits 214A-214n (two such interface circuits are depicted in FIG. 2, collectively "interface circuits 114") to receive the raw image data 120 and the display image quality metric 122. In embodiments, the one or more subjective allowable image distortion criterion 112 may be manually entered, for example by a system user via one or more user interfaces. In other embodiments, the display image quality metric 122 may be autonomously generated, for example by processor circuitry, central processor unit (CPU) circuitry, graphical processor unit (GPU) circuitry, or similar control circuitry communicatively coupled to the content adaptive correction circuitry 210. The use of the display image quality metric 122 provides a consistent and predictable level of distortion of the display image data 132 to the content adaptive correction circuitry 210 thereby improving user experience.

The content adaptive correction circuitry 210 includes circuitry capable of executing machine-readable instruction sets and/or logic to generate data representative of at least one distortion class pair 220. In embodiments, the content adaptive correction circuitry 210 generates data representative of a plurality of distortion class pairs 220. Each of the distortion class pairs 220 includes information and/or data representative of a display output in which the display image 152 has been distorted to reduce power consumption of the display backlight 154. In embodiments, each of the distortion class pairs 220 may include information and/or data representative of a percentage of distorted pixels included in the display image 152 and/or the degree of distortion of at least a portion of the pixels included in the display image 152. In embodiments, the content adaptive correction circuitry 210 may employ at least one objective measure of the distortion of the display image data 132 as compared to the raw image data 112. In embodiments, the content adaptive correction circuitry 210 may compare the objective measure of display image distortion with the display image quality metric 122 to ensure the distortion of the display image 152 is at or near the display image quality metric 122. In at least some embodiments, the content adaptive correction circuitry 210 may use the Video Multimethod Assessment Fusion (VMAF) video quality metric to provide the objective measure of display image distortion. VMAF provides an objective measure of image distortion having a range of 0 (worst distortion) to 100 (total fidelity between transformed and raw image). In such embodiments, the display image quality metric 122 may include data representative of a value between 0 and 100. The content adaptive correction circuitry 110 selects the distortion class pair 220 that provides an objective measure of display image distortion that is at or near the received display image quality metric 122. In addition, the selected distortion class pair 220 provides a display power savings, beneficially improving the operational life of self-powered electronic devices.

In embodiments, the content adaptive correction circuitry 210 may include trained neural network circuitry having an input layer capable of receiving raw image data 120 and the display image quality metric 122. The content adaptive correction circuitry 210 may include neural network circuitry any number of intermediate or hidden layers to determine the at least one distortion class pair 220. The content adaptive correction circuitry 210 may include an output layer to provide the distortion class pair 220 to the image transformation circuitry 230.

In embodiments, the image transformation circuitry 230 may include any number and/or combination of electronic components, semiconductor devices, optical components, and/or logic elements capable of applying a distortion defined by the distortion class pair 220 to the raw image data 112 to provide the display image data 132. In embodiments, the image transformation circuitry 230 may be disposed in whole or in part in display control circuitry communicatively coupled to a display device 150. In embodiments, the image transformation circuitry 230 may be disposed in whole or in part within GPU circuitry communicatively coupled to the content adaptive display power management system 130. The image transformation circuitry 230 outputs display image data 132 provided to a communicatively coupled display device 150.

Figure 3:
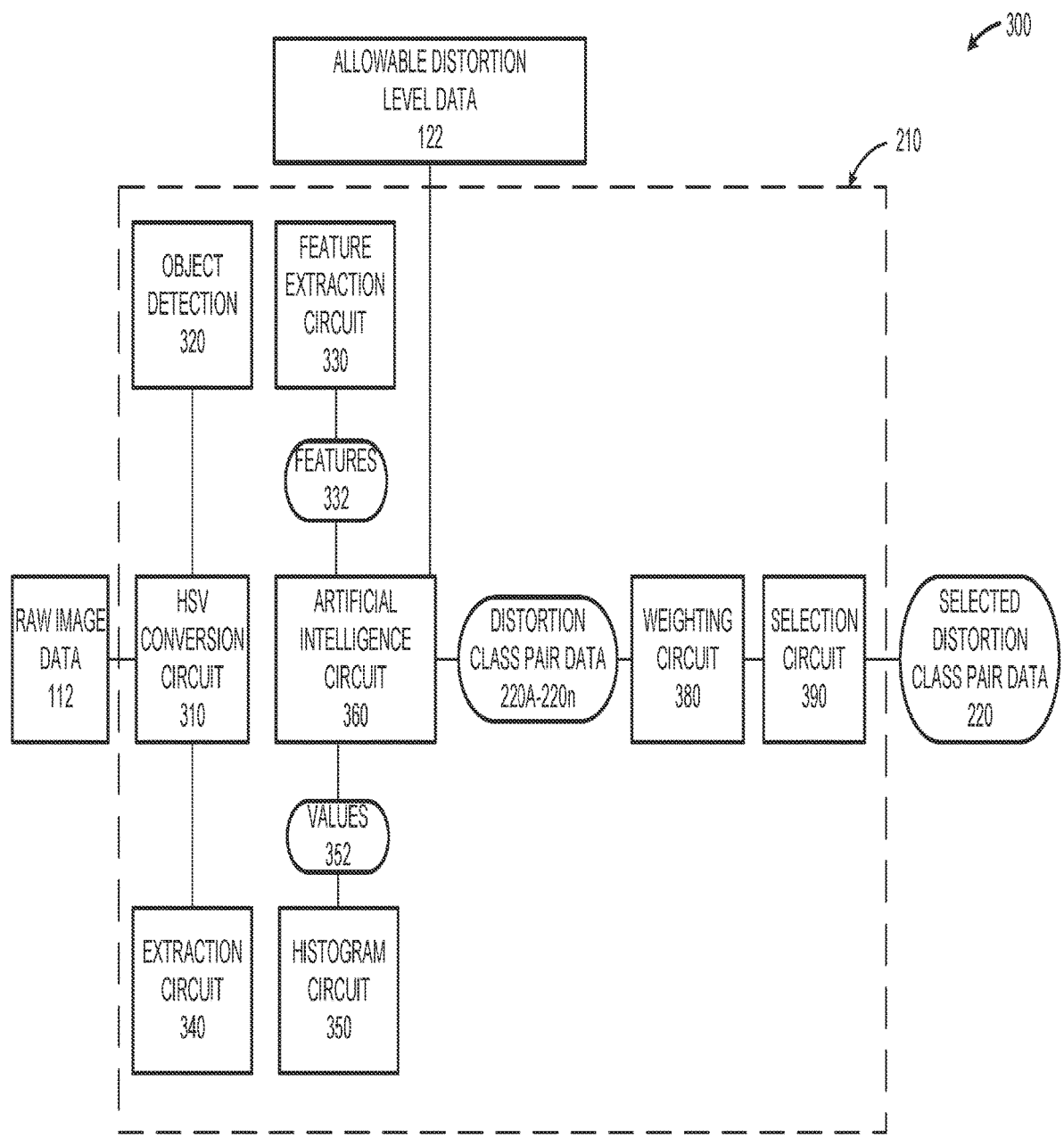
FIG. 3 is a block diagram of an illustrative content adaptive correction circuitry, in accordance with at least one embodiment described herein.

FIG. 3 is a block diagram of an illustrative content adaptive correction circuitry 210, in accordance with at least one embodiment described herein. As depicted in FIG. 3, the content adaptive correction circuitry 210 includes a Hue/Saturation/Value (HSV) conversion circuit 310 to receive the incoming raw image data 112. The HSV conversion circuit 310 includes any number and/or combination of currently available and/or future developed electronic components, semiconductor devices, optical components, and/or logic elements capable of converting the pixel data included in the incoming raw image data 112 to an HSV pixel data format. The HSV conversion circuit 310 forwards the HSV pixel data to an object detection circuit 320. In embodiments, the object detection circuit 320 may include a single level convolutional neural network (CNN) circuit 320 trained for object detection. The HSV conversion circuit 310 also forwards the HSV pixel data to a Value extraction circuit 330 configured to extract the "V" values for each pixel included in the raw image data 112.

The object detection circuit 320 generates an output based on the content of each of the pixels included in the raw image data 112. In embodiments, the object detection circuit 320 may implement the initial or all layers of a trained convolutional neural network (CNN) object detection model. In some embodiments, the object detection circuit 320 may implement the initial or all layers of a trained VGG16 CNN object detection model. The output data generated by the object detection circuit 320 is passed through an extraction circuit 330 to extract data representative of a defined number of features 332 from the output generated by the object detection circuit 330. In embodiments, the extraction circuit 330 may include a MaxPooling circuit to extract the defined number of features from the output data generated by the object detection circuit 320. In one or more embodiments, the extraction circuit 330 may include a MaxPooling circuit to extract data corresponding to 64 features 332 from the output data generated by the object detection circuit 320.

The extraction circuit 330 includes any number and/or combination of currently available and/or future developed electronic components, semiconductor devices, optical components, and/or logic elements capable of extracting "V" value information from the HSV data received from the HSV conversion circuit 310. The histogram circuit 350 receives the output data generated by the extraction circuit 330. The histogram circuit 350 apportions the extracted "V" values into a defined number of histogram buckets or groups, each of the buckets or groups providing one of the values 352. In embodiments, the histogram circuit 350 apportions each of the extracted "V" values into one of 64 buckets to generate an output data having 64 values 352.

An artificial intelligence (AI) circuit 360 receives the data corresponding to the features 332 and the data corresponding to the values 352. In embodiments, the AI circuit 360 includes one or more deep learning models trained to generate an output that includes one or more distortion class pairs 220A-220*n* for each of a number of distortion levels. Thus, the AI circuit 360 may receive the display image quality metric 122 and may, based on the received data corresponding to the features 332, the received data corresponding to the values 352, and the received display image quality metric 122, generate one or more distortion class pairs 220 that provide a distorted display image at or near the display image quality metric 122. In embodiments, the AI circuit 360 may include a plurality of fully connected (FC) layers. In embodiments, the number of distortion class pairs 220 generated by the AI circuit 360 may be based, at least in part, on the display image quality metric 122. For example, a display image quality metric 122 corresponding to a display image having relatively lesser distortion may have a lesser number of distortion classes than a display image quality metric 122 corresponding to a display image having relatively greater distortion may have a greater number of distortion classes.

In embodiments, the AI circuitry 360 generates distortion class pairs 220A-220*n*, each providing a different level of distortion to the display image data 132 to achieve a display power savings. The AI circuitry 360 communicates the one or more distortion class pairs 220A-220*n* to a weighting circuit 380 where each of the distortion class pairs 220A-220*n* are assigned weight factors based on the display image quality metric 122.

The weighting circuit 380 includes any number and/or combination of currently available and/or future developed electronic components, semiconductor devices, optical components, and/or logic elements configured to apply a respective weighting factor to each of the one or more distortion class pairs 220. In embodiments, distortion class pairs 220A-220*n* demonstrating a display image distortion having the closest value to the received display image quality metric 122 may be weighted more heavily than distortion class pairs 220A-220*n* demonstrating a display image distortion that deviates from the received display image quality metric 122.

The selection circuit 390 receives the weighted distortion class pairs 220A-220*n* from the weighting circuit 380. The selection circuit 390 includes any number and/or combination of currently available and/or future developed electronic components, semiconductor devices, optical components, and/or logic elements configured to select the weighted distortion class pair 220 having the closest correspondence to the received display image quality metric 122. The selection circuit 390 selects a distortion class pair 220 to apply to the raw image data 112 to produce the display image data 132 subsequently communicated to the display device 150.

The selection circuit 390 selects the distortion class pair 220A that provides a display image having distortion at or near the display image quality metric 122 when compared to the raw image data 112. In embodiments, the selection circuit 390 may select a distortion class pair 220 providing a display image having a relatively high degree of correspondence to the display image quality metric 122 and a relatively lesser power savings over a distortion class pair providing a relatively greater power savings but having a lesser degree of correspondence to the display image quality metric 122.

Figure 4:
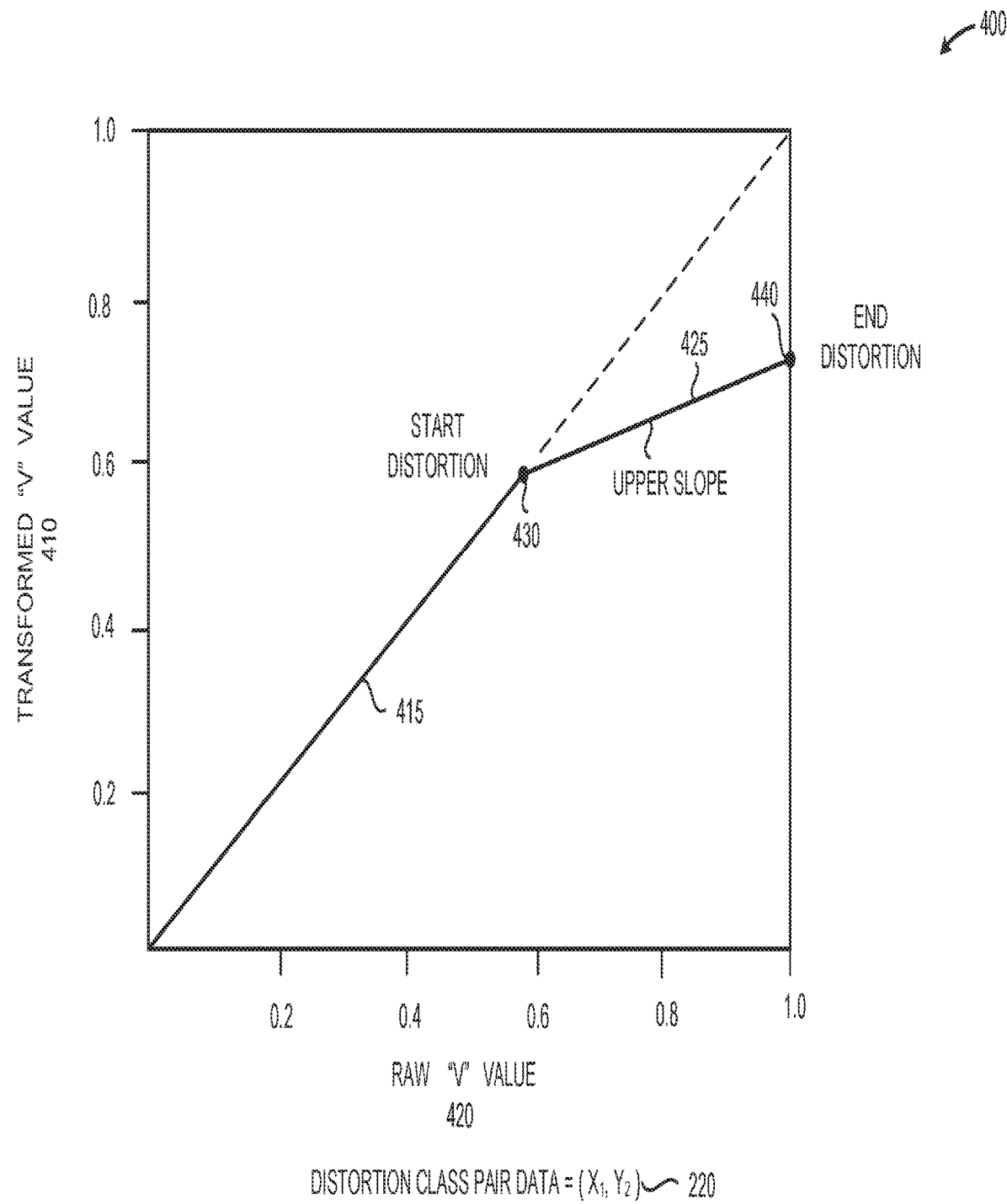
FIG. 4 is a graphical representation depicting transformed (or distorted) "V" values as a function of raw "V" values to provide a display image output generated using a distortion class pair, in accordance with at least one embodiment described herein.

FIG. 4 is a graphical representation 400 depicting transformed (or distorted) "V" values 410 as a function of raw "V" values 420 to provide a display image output 132 generated using a distortion class pair 220, in accordance with at least one embodiment described herein. As depicted in FIG. 4, the relationship between the distorted "V" values 410 and the raw "V" values 420 takes the form of a first line segment 415 having a first slope that relates the distorted "V" values 410 to the raw "V" values 420 and a second line segment 425 having a second slope that that relates the distorted "V" values 410 to the raw "V" values 420.

As depicted in FIG. 4, the first line segment 415 and the second line segment 425 intersect at an inflection point 430 having coordinates $(X_1, Y_1)$ that denote the starting or beginning location where pixel "V" values experience distortion. The first line segment 415 originates at the origin, i.e., at the point (0, 0). The second line segment terminates at a terminal point 440 having coordinates $(X_2, Y_2)$ that denote the terminal point where pixel "V" values no longer experience distortion. Thus, the distortion scheme or regime applied to the raw pixel data 112 may be characterized by two values, the inflection point Raw "V" Value $(X_1)$ and the second line segment 425 terminal point Distorted "V" Value $(Y_2)$. Therefore, in embodiments, the distortion class pair data 220 may be represented as a two-coordinate pair $(X_1, Y_2)$.

As depicted in FIG. 4, the first line segment 415 represents a "baseline" value that is associated with a particular class of display device or even, in some embodiments, characteristic of a specific display device. Thus the slope of the first line segment may be considered to represents a "baseline" power consumption of the display device. The second line segment 425, on the other hand, may be considered to represent the degree of distortion applied to a percentage of the raw pixels. Thus, the slope of the second line segment 425 is indicative of the degree of power savings provided by the distortion applied to the raw pixels. In embodiments, the lesser the slope of the second line segment 425, the lesser the power savings in the display device 150 and, conversely, the greater the slope of the second line segment 425, the greater the power savings in the display device 150.

Figure 5:
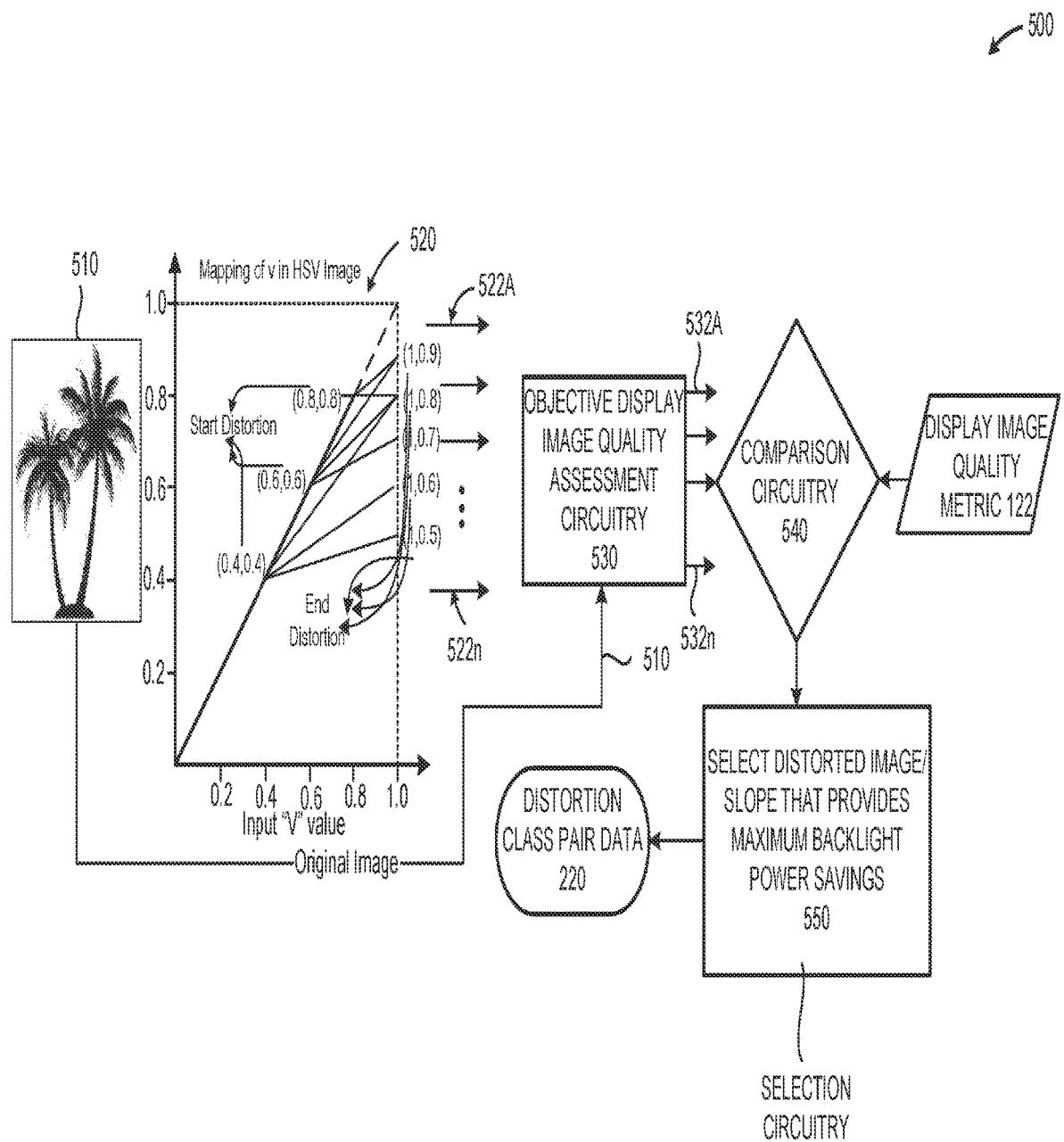
FIG. 5 is a schematic diagram depicting an illustrative training method used to train the AI circuitry, in accordance with at least one embodiment described herein.

FIG. 5 is a schematic diagram depicting an illustrative training method 500 used to train the AI circuitry 360, in accordance with at least one embodiment described herein. As depicted in FIG. 5, an original image 510 is distorted using a plurality of distortion parameters 520 to provide a plurality of distorted images 522A-522n (collectively, "distorted images 522"). In embodiments, the original image 510 may be distorted by selectively distorting various percentages of the pixels forming the original image 510 and/or selectively varying the level of distortion applied to the distorted pixels forming the original image 510.

Objective display image quality assessment circuitry 530 receives each of the distorted images 522 and the original image 510 to objectively measure the level of distortion present in each of the plurality of distorted images 522A-522n. The objective display image quality assessment circuitry 530 generates a plurality of display image quality assessment metrics 532A-532n (collectively, "display image quality assessment metrics 532"), each of which corresponds to and is associated with a respective one of the distorted images 522A-522n. Each of the display image quality assessment metrics 532A-532n includes information and/or data representative of a value corresponding to an objectively measurable level of distortion present in each of the distorted images 522A-522n. In embodiments, the objective display image quality assessment circuitry 530 may include circuitry capable of determining a Video Multimethod Assessment Fusion (VMAF) video quality metric.

Comparison circuitry 540 receives the display image quality assessment metrics 532A-532n and compares each of the display image quality assessment metrics 532A-532n with the display image quality metric 122 to determine whether the distortion applied to the original image 510 exceeds the display image quality metric 122. Selection circuitry 550 selects the distortion class pair 220 that provides the greatest display device power saving while maintaining a display image quality assessment metric 532 that is at or near the display image quality metric 122.

Figure 6:
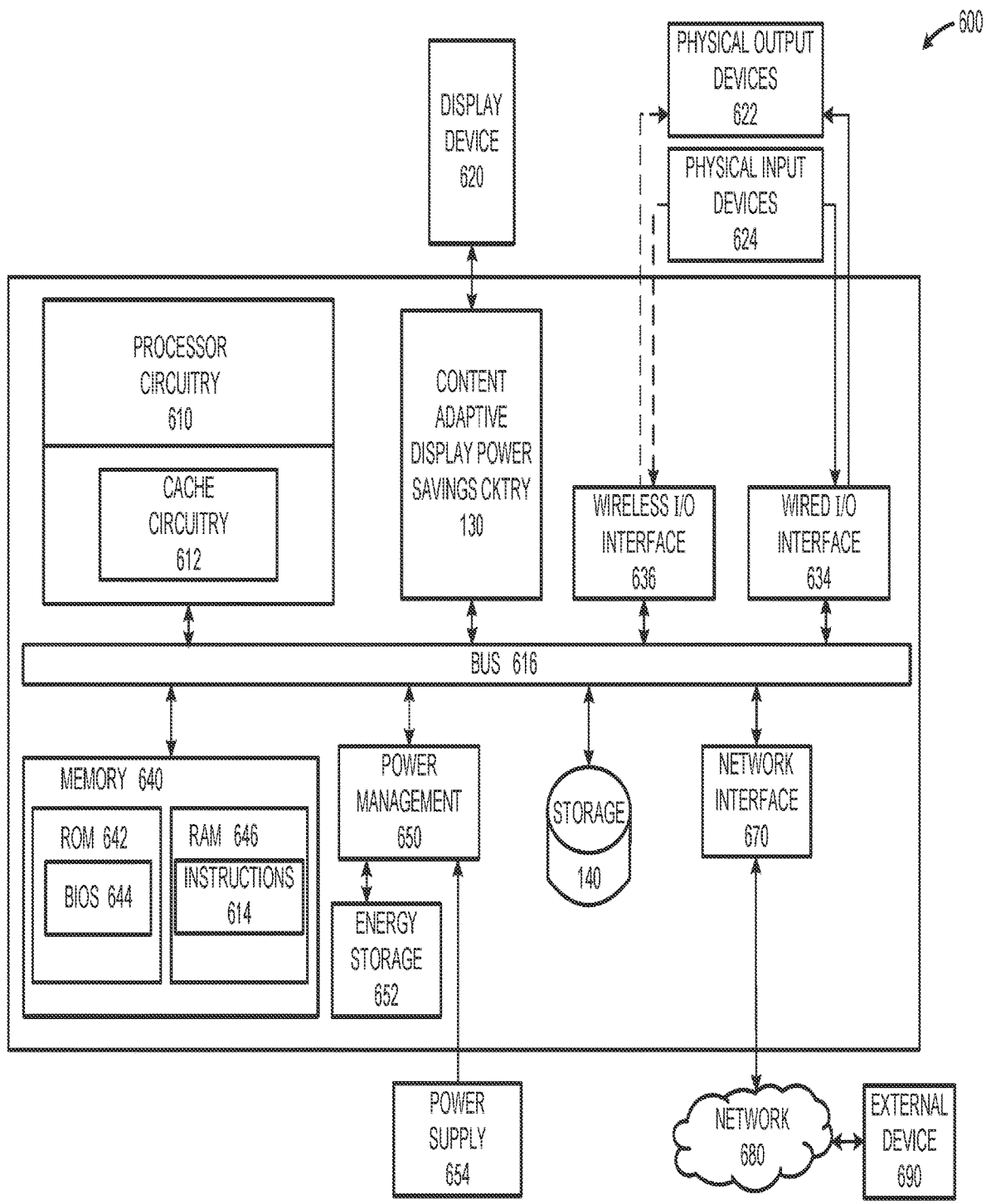
FIG. 6 is a schematic diagram of an illustrative electronic, processor-based, device that includes a content adaptive display power management system to reduce the power consumption of a communicatively coupled display device, in accordance with at least one embodiment described herein.

FIG. 6 is a schematic diagram of an illustrative electronic, processor-based, device 600 that includes a content adaptive display power management system 130 to reduce the power consumption of a communicatively coupled display device 620, in accordance with at least one embodiment described herein. The processor-based device 600 may additionally include one or more of the following: processor circuitry 610, processor cache circuitry 612, system memory 640, power management circuitry 650, a non-transitory storage device 140, and a network interface 670. The following discussion provides a brief, general description of the components forming the illustrative processor-based device 600. Example, non-limiting processor-based devices 600 may include, but are not limited to: smartphones, wearable computers, portable computing devices, handheld computing devices, desktop computing devices, servers, blade server devices, workstations, and similar.

In some embodiments, the content adaptive display power management system 130 may be disposed in whole or in part within graphics processing unit (GPU) or similar structure or circuitry capable of executing machine-readable instruction sets and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 610 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 600 includes a bus or similar communications link 616 that communicably couples and facilitates the exchange of information and/or data between various system components including the processor circuitry 610, the content adaptive display power management system 130, one or more wired I/O interfaces 634, one or more wireless I/O interfaces 636, the system memory 670, one or more non-transitory storage devices 140, and/or one or more network interfaces 670. The processor-based device 600 may be referred to in the singular herein, but this is not intended to limit the embodiments to a single processor-based device 600, since in certain embodiments, there may be more than one processor-based device 600 that incorporates, includes, or contains any number of communicably coupled, collocated, or remote networked circuits or devices.

The processor circuitry 610 may include any number, type, or combination of currently available or future developed devices capable of executing machine-readable instruction sets. The processor circuitry 610 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the processor-based device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the processor-based device 600, for example by causing the processor circuitry 510 to load and/or execute one or more machine-readable instruction sets 614. In embodiments, at least some of the one or more machine-readable instruction sets cause at least a portion of the processor circuitry 610 to provide, create, produce, transition, and/or function as a dedicated, specific, and particular machine, for example a word processing machine, a digital image acquisition machine, a media playing machine, a gaming system, a communications device, a smartphone, an autonomous vehicle control system, or similar.

The processor-based device 600 may include at least one wireless input/output (I/O) interface 636. The at least one wireless I/O interface 636 may be communicably coupled to one or more physical output devices 622 (tactile devices, video displays, audio output devices, hardcopy output devices, etc.). The at least one wireless I/O interface 636 may communicably couple to one or more physical input devices 624 (pointing devices, touchscreens, keyboards, tactile devices, etc.). The at least one wireless I/O interface 636 may include any currently available or future developed wireless I/O interface. Example wireless I/O interfaces 636 include, but are not limited to: BLUETOOTH®, near field communication (NFC), and similar.

The processor-based device 600 may include one or more wired input/output (I/O) interfaces 634. The at least one wired I/O interface 634 may be communicably coupled to one or more physical output devices 622 (tactile devices, video displays, audio output devices, hardcopy output devices, etc.). The at least one wired I/O interface 634 may be communicably coupled to one or more physical input devices 624 (pointing devices, touchscreens, keyboards, tactile devices, etc.). The wired I/O interface 634 may include any currently available or future developed I/O interface. Example wired I/O interfaces 634 include but are not limited to: universal serial bus (USB), IEEE 1394 ("FireWire"), and similar.

The processor-based device 600 may include one or more communicably coupled, non-transitory, data storage devices 140. The data storage devices 140 may include one or more hard disk drives (HDDs) and/or one or more solid-state storage devices (SSDs). The one or more data storage devices 140 may include any current or future developed storage appliances, network storage devices, and/or systems. Non-limiting examples of such data storage devices 140 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 140 may include one or more removable storage devices, such as one or more flash drives, flash memories, flash storage units, or similar appliances or devices capable of communicable coupling to and decoupling from the processor-based device 600.

The one or more data storage devices 140 may include interfaces or controllers (not shown) communicatively coupling the respective storage device or system to the bus 616. The one or more data storage devices 140 may store, retain, or otherwise contain machine-readable instruction sets, data structures, program modules, data stores, databases, logical structures, and/or other data useful to the processor circuitry 610 and/or one or more applications executed on or by the processor circuitry 610. In some instances, one or more data storage devices 140 may be communicably coupled to the processor circuitry 610, for example via the bus 616 or via one or more wired communications interfaces 634 (e.g., Universal Serial Bus or USB); one or more wireless communications interfaces 636 (e.g., Bluetooth®, Near Field Communication or NFC); and/or one or more network interfaces 670 (IEEE 802.3 or Ethernet, IEEE 802.11, or WiFi®, etc.).

The processor-based device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power supply 654 to the energy storage device 652 and/or to the processor-based device 600. The power source 654 may include, but is not limited to, a solar power system, a commercial electric grid, a portable generator, an external energy storage device, or any combination thereof.

For convenience, the processor circuitry 610, the storage device 140, the system memory 640, the wireless I/O interface 636, the wired I/O interface 634, the power management circuitry 650, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In some embodiments, all or a portion of the bus 316 may be omitted and the components are coupled directly to each other using suitable wired or wireless connections.

Figure 7:
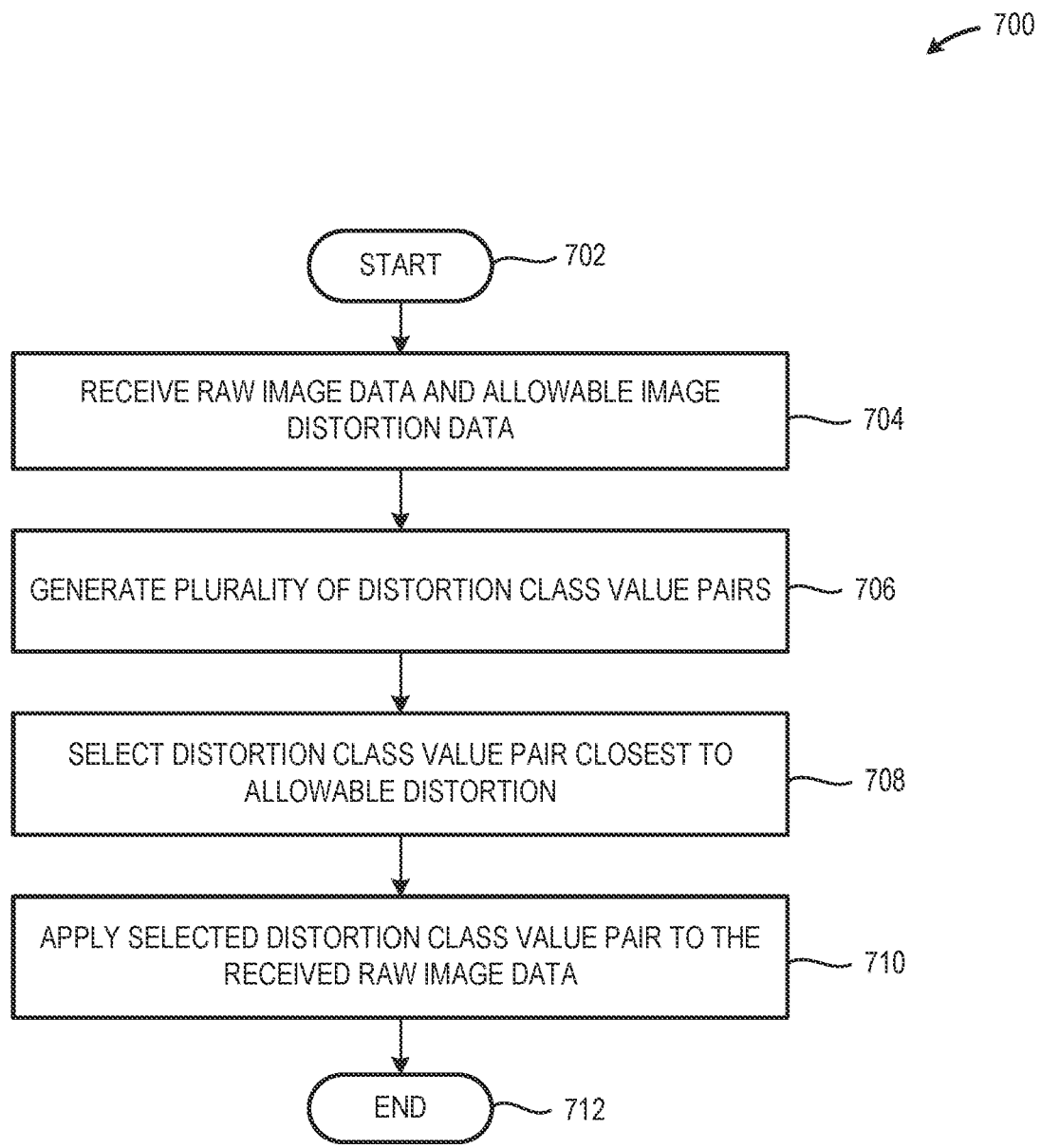
FIG. 7 is a logic flow diagram of an illustrative high-level method of a reducing the power consumption of a display device on a content adaptive basis, in accordance with at least one embodiment described herein.

FIG. 7 is a logic flow diagram of an illustrative high-level method 700 of a reducing the power consumption of a display device 150 on a content adaptive basis, in accordance with at least one embodiment described herein. The method 700 beneficially and advantageously uses an objectively measurable system or method to quantitatively assess the level of distortion introduced to raw image data 112, thereby allowing a generally consistent level of distortion and improving user experience. The method 700 commences at 702.

At 704, the content adaptive display power management system 130 receives an input that includes data representative of a display image quality metric 122. In embodiments, the display image quality metric 122 may include data representative of a numerical Video Multimethod Assessment Fusion (VMAF) video quality metric. For example, the display image quality metric 122 may include data representative of a VMAF video quality metric between 0 and 100. At 704, the content adaptive display power management system 130 also receives raw image data 112. The raw image data 112 may include image data having any current or future developed video format, encoding scheme, and/or encryption scheme. For example, the raw image data 112 may be received in JPEG, MPEG, MP4, or HSV format.

At 706, the content adaptive display power management system 130 generates a plurality of distortion class value pairs 220A-220n using the received raw image data 112. In embodiments, each of the distortion class value pairs 220A-220n includes information and/or data representative of the percentage of pixels included in the raw image data 112 that will be distorted and information and/or data representative of the degree of distortion of the pixels included in the raw image data 112. In embodiments, each of the distortion class value pairs 220A-220n has associated therewith a corresponding display device power savings.

At 708, the content adaptive display power management system 130 evaluates each of the distortion class value pairs 220A-220n. The content adaptive display power management system 130 then selects the distortion class value pair 220 that provides an objectively measurable level of distortion closest to the received display image quality metric 122. Since each of the distortion class value pairs 220A-220n represents a display device power savings, the distortion class value pair 220 selected by the content adaptive display power management system 130 will beneficially provide a display power savings. Advantageously, by selecting the distortion class value pair 220 that provides a display image having a distortion closest to the display image quality metric 122 a consistent and predictable level of distortion in the display image, thereby improving user experience.

At 710, the content adaptive display power management system 130 applies the selected distortion class value pair 220 to the raw image data 112 to generate the display image data 132. The method 700 concludes at 712.

Figure 8:
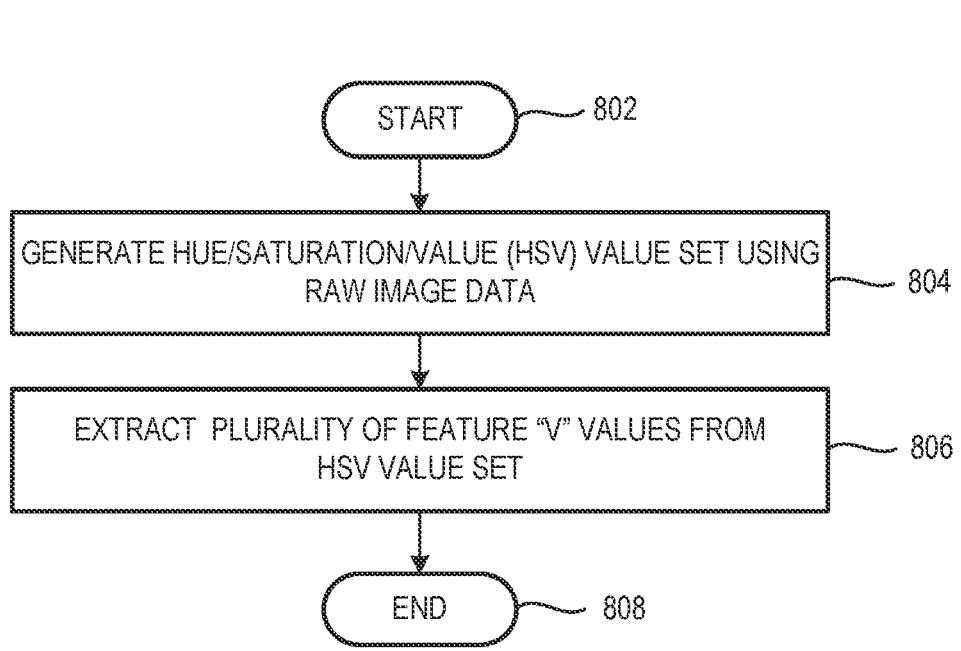
FIG. 8 is a flow diagram of a high-level method of converting raw image data from a raw data format to a hue/saturation/value (HSV) format compatible with the content adaptive display power management system, in accordance with at least one embodiment described herein.

FIG. 8 is a flow diagram of a high-level method 800 of converting raw image data 112 from a raw data format to a hue/saturation/value (HSV) format compatible with the content adaptive display power management system 130, in accordance with at least one embodiment described herein. The method 800 may be used in conjunction with the method 700 described above in FIG. 7. In embodiments, the raw image data 112 may first be converted to HSV format prior to introduction to the artificial intelligence circuitry 360. The method 800 commences at 802.

At 804, an HSV conversion circuit 310 converts the raw image data 112 to HSV format image data.

At 806, an extraction circuit 340 extracts the "V" values from the HSV format image data. The extracted "V" values are passed to a histogram circuit 350 that includes a defined number (e.g., 64) histogram sub-ranges or "buckets." The respective value associated with each of the "buckets" provides a plurality of "V" values. The method 800 concludes at 808.

Figure 9:
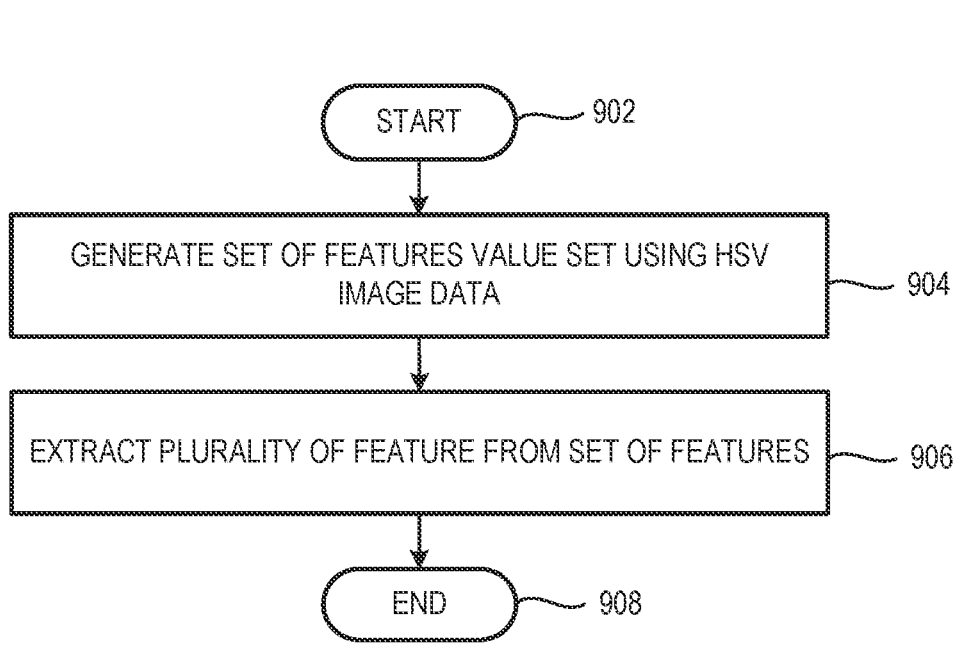
FIG. 9 is a flow diagram of a high-level method 800 of extracting object related data from raw image data that has been converted to HSV format raw image data, in accordance with at least one embodiment described herein.

FIG. 9 is a flow diagram of a high-level method 900 of extracting object related data from raw image data 112 that has been converted to HSV format raw image data, in accordance with at least one embodiment described herein. The method 900 may be used in conjunction with the method 700 described above in FIG. 7 and/or the method 800 described above in FIG. 8. In embodiments, the raw image data 112 is first be converted to HSV format. The method 900 commences at 902.

At 904, an object detection circuit 320 detects features corresponding to objects in the HSV format raw image data converts the raw image data 112 to HSV format image data. In embodiments, the object detection circuit 320 may include a convolutional neural network (CNN) trained for object detection and/or recognition using the HSV format raw image data. In embodiments, the object detection circuit 320 may include initial or all layers of trained CNN trained for object detection and/or recognition using the HSV format raw image data. In embodiments, the object detection circuit 320 may include initial or all layers of trained VGG16 CNN. The object detection circuit 320 generates data representative of features present in the HSV format raw image data.

At 906 feature extraction circuit 330 receives the data representative of features present in the HSV format raw image data from the object detection circuit 320. The feature extraction circuit 330 reduces the data representative of features present in the HSV format raw image data to a defined number of features (e.g., 64 features) to provide a plurality of features that are provided to the AI circuit 360. In embodiments, the feature extraction circuit 330 may use a MaxPooling function to generate the plurality of features. The method 900 concludes at 908.

Figure 10:
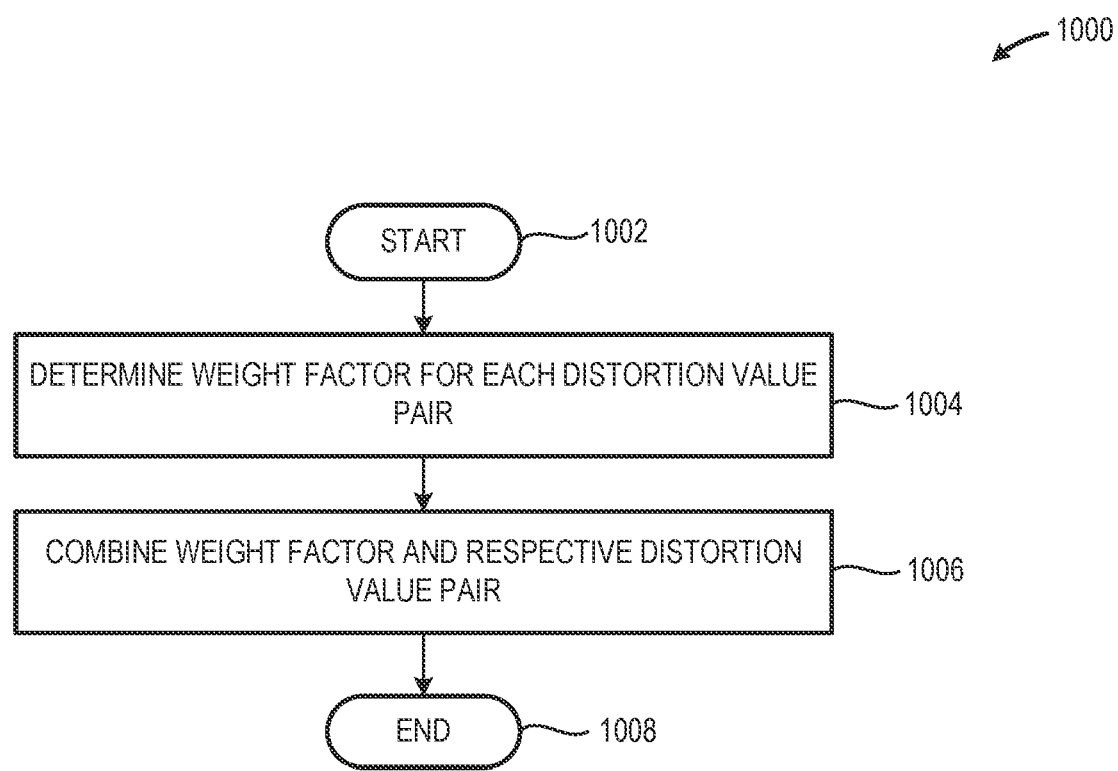
FIG. 10 is a flow diagram of an illustrative method for determining and assigning a respective weight to each of the plurality of distortion class value pairs based, at least in part, on the difference between the distortion present in the display image data and the display image quality metric, in accordance with at least one embodiment described herein.

FIG. 10 is a flow diagram of an illustrative method 1000 for determining and assigning a respective weight to each of the plurality of distortion class value pairs 220A-220n based, at least in part, on the difference between the distortion present in the display image data 132 and the display image quality metric 122, in accordance with at least one embodiment described herein. Each of the distortion class value pairs 220A-220n generated by the AI circuit 360 provides a display device power savings. To maintain a consistent level of display image distortion thereby improving user experience, the value representative of the distortion associated with each of the distortion class value pairs 220A-220n may be weighted based upon the difference between the distortion present in the display image data 132 and the display image quality metric 122. The method 1000 commences at 1002.

At 1004, a weighting circuit 380 determines a respective weight value to assign to each of the plurality of distortion class value pairs 220A-220n generated by the AI circuit 360. In embodiments, the weighting circuit 380 may determine a weight value based on the difference between the distortion present in the display image data 132 and the display image quality metric 122 such that final image distortion levels that exceed a defined threshold above and/or below the display image quality metric 122 are assigned lesser weight values than those within the defined threshold. In embodiments the weighting circuit 380 may determine a weight value based on the proximity of the final image distortion levels to the defined threshold above and/or below the display image quality metric 122 such that distortion value pairs 220 providing a display image distortion closer to the display image quality metric 122 are weighted more highly than distortion value pairs 220 having a relatively greater deviation from the display image quality metric 122.

At 1006, the weighting circuit 380 combines the weighting factor calculated for each distortion class value pair 220 with the respective distortion class value pair 220. To provide a weighted distortion class value pair. The method 1000 concludes at 1008.

While FIGS. 7, 8, 9, and 10 illustrate various operations according to one or more embodiments, it is to be understood that not all of the operations depicted in FIGS. 7, 8, 9, and 10 are necessary for other embodiments. Indeed, it is fully contemplated herein that in other embodiments of the present disclosure, the operations depicted in FIGS. 7, 8, 9, and 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the terms "circuit" and "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for reducing display image power consumption while maintaining a consistent, objectively measurable, level of image distortion that comports with a manually entered or autonomously generated display image quality metric. Raw image data is converted to HSV format raw image data. The "V" values are extracted from the HSV format raw image data and a histogram generates a plurality of "V" values. The HSV format raw image data is provided to initial or all layers of trained CNN to extract a plurality of features. The plurality of "V" values and the plurality of features are provided to a trained AI circuit to generate a plurality of distortion class value pairs. Each of the distortion class value pairs is weighted based on proximity of display image distortion caused by the respective distortion class value pairs and the display image quality metric. The distortion class pair providing a display image distortion close to the display image quality metric is applied to the raw image data to generate the display image data.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for reducing display image power consumption while maintaining a consistent, objectively measurable, level of image distortion that comports with a manually entered or autonomously generated display image quality metric.

According to example 1, there is provided content adaptive display power reduction circuitry. The content adaptive display power reduction circuitry may include: at least one input/output (I/O) interface to: receive raw image data; and receive at least one input that includes data indicative of an objective display image quality metric; artificial intelligence circuitry to generate an output that includes a plurality of distortion class value pairs determined using data obtained from the received raw image data; selection circuitry to select one of the distortion class value pairs included in the plurality of distortion class value pairs, the selection based on a respective level of distortion introduced to the raw image data by application of each of the plurality of distortion class value pairs and the objective display image quality metric; and image transformation circuitry to apply the selected distortion class value pair to the received raw image data to generate display image data.

Example 2 may include elements of example 1, the content adaptive display power reduction circuitry may further include: Hue/Saturation/Value (HSV) circuitry to receive the raw image data and generate an HSV value set using the received raw image data.

Example 3 may include elements of any of examples 1 and 2, the content adaptive display power reduction circuitry further including: feature extraction circuitry to generate a first plurality of feature values based on features present in the received raw image data.

Example 4 may include elements of any of examples 1 through 3 where the feature extraction circuitry may include a convolutional neural network (CNN).

Example 5 may include elements of any of examples 1 through 4 where the convolutional neural network (CNN) may include at least one layer of a trained VGG16 convolutional neural network (CNN).

Example 6 may include elements of any of examples 1 through 5, the content adaptive display power reduction circuitry of claim 3 may further include: value extraction circuitry to generate a second plurality of feature values using "V" values included in the HSV value set.

Example 7 may include elements of any of examples 1 through 6 where the data obtained from the received raw image data provided to the AI circuitry includes: the first plurality of feature values based on features present in the received raw image data and the second plurality of feature values using "V" values included in the HSV value set.

Example 8 may include elements of any of examples 1 through 7, the content adaptive display power reduction circuitry may further include: weighting circuitry to: receive the plurality of distortion class value pairs from the AI circuitry; and determine a respective weight factor associated with each of the plurality of distortion class value pairs to generate a plurality of weighted distortion class value pairs.

According to example 9, there is provided a content adaptive display power reduction method. The method may include: receiving, via at least one input/output (I/O) interface, data representative of a raw image and data indicative of an objective display image quality metric; generating, by artificial intelligence circuitry, a plurality of distortion class value pairs determined using data obtained from the received raw image data; selecting, by selection circuitry, one of the distortion class value pairs included in the plurality of distortion class value pairs, the selection based on a respective level of distortion introduced to the raw image data by application of each of the plurality of distortion class value pairs and the objective display image quality metric; and applying, by image transformation circuitry, the selected distortion class value pair to the received raw image data to generate display image data.

Example 10 may include elements of example 9, and the method may further include: generating, via Hue/Saturation/Value (HSV) circuitry, an HSV value set using the received raw image data.

Example 11 may include elements of any of examples 9 or 10, and the method may further include: generating, via feature extraction circuitry, a first plurality of feature values based on features present in the received raw image data.

Example 12 may include elements of any of examples 9 through 11 where generating the first plurality of feature values based on features present in the received raw image data may further include: generating, via a convolutional neural network (CNN), the first plurality of feature values based on features present in the received raw image data.

Example 13 may include elements of any of examples 9 through 12 where generating the first plurality of feature values based on features present in the received raw image data may further include: generating, via at least one layer of a trained VGG16 convolutional neural network (CNN), the first plurality of feature values based on features present in the received raw image data.

Example 14 may include elements of any of examples 9 through 13, and the method may further include: generating, via value extraction circuitry, a second plurality of feature values using "V" values included in the HSV value set.

Example 15 may include elements of any of examples 9 through 14 where generating a plurality of distortion class value pairs using data obtained from the received raw image data may further include: generating a plurality of distortion class value pairs using: the first plurality of feature values based on features present in the received raw image data; and the second plurality of feature values using "V" values included in the HSV value set determined using the received raw image data.

Example 16 may include elements of any of examples 9 through 15, and the method may further include: receiving, by weighting circuitry, each of the distortion class value pairs from the AI circuitry; and determining, by the weighting circuitry, a weight factor for each of the plurality of distortion class value pairs to generate a plurality of weighted distortion class value pairs.

Example 17 may include elements of any of examples 9 through 16 where selecting one of the distortion class value pairs included in the plurality of distortion class value pairs may further include: selecting, by selection circuitry, one of the weighted distortion class value pairs included in the plurality of weighted distortion class value pairs.

According to example 18, there is provided a non-transitory storage device that includes instructions that, when executed by a content adaptive display power reduction control circuit, cause the control circuit to: cause artificial intelligence circuitry to generate a plurality of distortion class value pairs using raw image data; cause selection circuitry to select one of the distortion class value pairs included in the plurality of distortion class value pairs, the selection based on a respective level of distortion introduced to the raw image data by application of each of the plurality of distortion class value pairs and an objective display image quality metric; and cause image transformation circuitry to apply the selected distortion class value pair to the received raw image data to generate display image data.

Example 19 may include elements of example 18 where the instructions may further cause the control circuitry to: cause Hue/Saturation/Value (HSV) circuitry to generate an HSV value set using the raw image data.

Example 20 may include elements of any of examples 18 or 19 where the instructions may further cause the control circuitry to: cause feature extraction circuitry to generate a first plurality of feature values based on features present in the received raw image data.

Example 21 may include elements of any of examples 18 through 20 where the instructions that cause the control circuit to cause the feature extraction circuitry to generate the first plurality of feature values based on features present in the raw image data may further cause the control circuitry to: cause a convolutional neural network (CNN) circuit to generate the first plurality of feature values based on features present in the received raw image data.

Example 22 may include elements of any of examples 18 through 21 where the instructions that cause the control circuit to cause the feature extraction circuitry to generate the first plurality of feature values based on features present in the received raw image data may further cause the control circuitry to: cause at least one layer of a trained VGG16 convolutional neural network (CNN) circuit to generate the first plurality of feature values based on features present in the received raw image data.

Example 23 may include elements of any of examples 18 through 22 where the instructions may further cause the control circuitry to: cause value extraction circuitry to generate a second plurality of feature values using "V" values included in the HSV value set.

Example 24 may include elements of any of examples 18 through 23 where the instructions that cause the control circuitry to cause artificial intelligence circuitry to generate a plurality of distortion class value pairs using raw image data and data indicative of an allowable image distortion value may further cause the control circuitry to: cause the artificial intelligence circuitry to receive, via at least one input/output (I/O) interface, the first plurality of feature values based on features present in the received raw image data; and the second plurality of feature values using "V" values included in the HSV value set.

Example 25 may include elements of any of examples 18 through 24 where the instructions may further cause the control circuitry to: cause weighting circuitry to determine a weight factor for each of the plurality of distortion class value pairs to generate a plurality of weighted distortion class value pairs.

Example 26 may include elements of any of examples 18 through 25 where the instructions that cause the control circuitry to cause selection circuitry to select one of the distortion class value pairs included in the plurality of distortion class value pairs may further cause the control circuitry to: cause selection circuitry to select one of the weighted distortion class value pairs included in the plurality of weighted distortion class value pairs; and According to example 27, there is provided a content adaptive display power reduction system. The system may include: means for receiving data representative of a raw image and data indicative of an allowable image distortion value; means for generating a plurality of distortion class value pairs determined using data obtained from the received raw image data; means for selecting one of the distortion class value pairs included in the plurality of distortion class value pairs, the selection based on a respective level of distortion introduced to the raw image data by application of each of the plurality of distortion class value pairs and the objective display image quality metric; and means for applying the selected distortion class value pair to the received raw image data to generate display image data.

Example 28 may include elements of example 27, and the system may further include: means for generating an HSV value set using the received raw image data.

Example 29 may include elements of any of examples 27 or 28, and the system may further include: means for generating a first plurality of feature values based on features present in the received raw image data.

Example 30 may include elements of any of examples 27 through 29 where the means for generating the first plurality of feature values based on features present in the received raw image data may further include: convolutional neural network (CNN) means for generating the first plurality of feature values based on features present in the received raw image data.

Example 31 may include elements of any of examples 27 through 30 where the convolutional neural network (CNN) means for generating the first plurality of feature values based on features present in the received raw image data may further include: at least one layer of a trained VGG16 convolutional neural network (CNN) means for generating the first plurality of feature values based on features present in the received raw image data.

Example 32 may include elements of any of examples 27 through 31, and the system may further include: means for generating a second plurality of feature values using "V" values included in the HSV value set.

Example 33 may include elements of any of examples 27 through 32 where the means for generating the plurality of distortion class value pairs using the data obtained from the received raw image data may further include: means for generating a plurality of distortion class value pairs using: the first plurality of feature values based on features present in the received raw image data; and the second plurality of feature values using "V" values included in the HSV value set determined using the received raw image data.

Example 34 may include elements of any of examples 27 through 33, and the system may further include: means for receiving each of the distortion class value pairs from the AI circuitry; and means for determining a weight factor for each of the plurality of distortion class value pairs to generate a plurality of weighted distortion class value pairs.

Example 35 may include elements of any of examples 27 through 34 where the means for selecting one of the distortion class value pairs included in the plurality of distortion class value pairs may further include: means for selecting one of the weighted distortion class value pairs included in the plurality of weighted distortion class value pairs.

According to example 36, there is provided an electronic device. The electronic device may include: processor circuitry; at least one display device; and content adaptive display power reduction circuitry coupled to the processor circuitry and the display device, the content adaptive display power reduction circuitry, including: at least one input/output (I/O) interface to: receive raw image data; and receive at least one input that includes data indicative of an objective video quality metric; artificial intelligence circuitry to generate an output that includes a plurality of distortion class value pairs determined using data obtained from the received raw image data; selection circuitry to select one of the distortion class value pairs included in the plurality of distortion class value pairs, the selection based on a respective level of distortion introduced to the raw image data by application of each of the plurality of distortion class value pairs and the objective display image quality metric; and image transformation circuitry to apply the selected distortion class value pair to the received raw image data to generate display image data.

Example 37 may include elements of example 36, and the device may further include: Hue/Saturation/Value (HSV) circuitry to receive the raw image data and generate an HSV value set using the received raw image data.

Example 38 may include elements of any of examples 36 or 37 and the electronic device may further include: feature extraction circuitry to generate a first plurality of feature values based on features present in the received raw image data.

Example 39 may include elements of any of examples 36 through 38 where the feature extraction circuitry comprises a convolutional neural network (CNN).

Example 40 may include elements of any of examples 36 through 39 where the convolutional neural network (CNN) comprises at least one layer of a trained VGG16 convolutional neural network (CNN).

Example 41 may include elements of any of examples 36 through 40 and the electronic device may further include: value extraction circuitry to generate a second plurality of feature values using "V" values included in the HSV value set.

Example 42 may include elements of any of examples 36 through 41 where the data obtained from the received raw image data provided to the AI circuitry may include: the first plurality of feature values based on features present in the received raw image data and the second plurality of feature values using "V" values included in the HSV value set.

Example 43 may include elements of any of examples 36 through 42 and the electronic device may further include: weighting circuitry to: receive each of the distortion class value pairs from the AI circuitry; and determine a weight factor for each of the plurality of distortion class value pairs to generate a plurality of weighted distortion class value pairs.

According to example 44, there is provided a system for reducing the power consumption of a display device while maintaining an objectively measurable level of image distortion, the system being arranged to perform the method of any of examples 9 through 17.

According to example 45, there is provided a chipset arranged to perform the method of any of examples 9 through 17.

According to example 46, there is provided a non-transitory machine readable medium comprising a plurality of instructions that, in response to be being executed on a computing device, cause the computing device to carry out the method according to any of examples 9 through 17.

According to example 47, there is provided a device configured for reducing the power consumption of a display device while maintaining an objectively measurable level of image distortion, the device being arranged to perform the method of any of the examples 9 through 17.

The terms and expressions which have been employed herein are used as terms of description and not of limitation, and there is no intention, in the use a such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. An apparatus comprising:
memory;
instructions; and
at least one processor to execute the instructions to cause the at least one processor to at least:
execute an artificial intelligence model to generate output data based on raw image data representing an image to be displayed on a display;
select a subset of a plurality of distortion class value pairs based on a respective level of distortion introduced to the raw image data by application of respective ones of the plurality of distortion class value pairs and an objective display image quality metric, the plurality of distortion class value pairs based on the output data from the artificial intelligence model; and
apply the selected subset of the plurality of distortion class value pairs to the raw image data to generate display image data to be used to generate a display image on the display.

2. The apparatus of claim 1, wherein the output data from the artificial intelligence model includes data indicative of an allowable percentage of distorted pixels and data indicative of a degree of distortion of pixels in the display image data.

3. The apparatus of claim 1, wherein the plurality of distortion class value pairs includes a first distortion class value pair having a first degree of correspondence to the objective display image quality metric and a first level of power savings and a second distortion class value pair having a second degree of correspondence to the objective display image quality metric and a second level of power savings, the first degree of correspondence higher than the second degree of correspondence, the first level of power savings lower than the second level of power savings, the processor is to select the first distortion class value pair.

4. The apparatus of claim 1, wherein the processor is to weight the plurality of distortion class value pairs such that ones of the plurality of distortion class value pairs resulting in distortion that satisfies a threshold associated with the objective display image quality metric are weighted higher than ones of the plurality of distortion class value pairs resulting in distortion that does not satisfy the threshold.

5. The apparatus of claim 1, wherein the processor is to generate a Hue/Saturation/Value (HSV) set using the raw image data.

6. The apparatus of claim 5, wherein the processor is to generate a first plurality of feature values based on features present in the raw image data.

7. The apparatus of claim 6, wherein the processor is to execute a convolutional neural network (CNN) model to generate the first plurality of feature values.

8. The apparatus of claim 7, wherein the convolutional neural network (CNN) model includes at least one layer of a trained VGG16 convolutional neural network (CNN).

9. The apparatus of claim 6, wherein the processor is to generate a second plurality of feature values using "V" values included in the HSV set.

10. The apparatus of claim 9, wherein the processor is to execute the artificial intelligence model to generate the output data based on the first plurality of feature values and the second plurality of feature values.

11. A non-transitory computer readable storage medium comprising instructions that, when executed, cause at least one processor to at least:
generate a Hue/Saturation/Value (HSV) set based on raw image data corresponding to an image to be displayed on a display;
generate a first plurality of feature values based on features in the raw image data;
generate a second plurality of feature values using "V" values in the HSV set;
execute an artificial intelligence model to generate output data based on the first plurality of feature values and the second plurality of feature values;
select a distortion class value pair from a plurality of distortion class value pairs, the plurality of distortion class value pairs based on the output data; and
apply the selected distortion class value pair to the raw image data to generate display image data representing a display image to be displayed on the display.

12. The non-transitory computer readable storage medium of claim 11, wherein the plurality of distortion class value pairs includes a first distortion class value pair having a first degree of correspondence to an objective display image quality metric and a first level of power savings and a second distortion class value pair having a second degree of correspondence to the objective display image quality metric and a second level of power savings, the first degree of correspondence higher than the second degree of correspondence, the first level of power savings lower than the second level of power savings, and the instructions, when executed, cause the at least one processor to select, the first distortion class value pair as the selected distortion class value pair.

13. The non-transitory computer readable storage medium of claim 11, wherein the instructions, when executed, cause the at least one processor to weight the plurality of distortion class value pairs such that a first set of the plurality of distortion class value pairs resulting in distortion that satisfies a threshold associated with an objective display image quality metric are weighted higher than a second set of the plurality of distortion class value pairs resulting in distortion that does not satisfy the threshold range.

14. The non-transitory computer readable storage medium of claim 11, wherein the instructions, when executed, cause the at least one processor to execute the artificial intelligence model to generate the output data based on a Video Multimethod Assessment Fusion (VMAF) quality metric.

15. An electronic device comprising:
processor circuitry;
a display; and
power reduction circuitry in circuit with the processor circuitry and the display, the power reduction circuitry including:
at least one input/output (I/O) interface to:
receive raw image data; and
receive an input that includes data indicative of an objective video quality metric;
artificial intelligence circuitry to generate an output that includes a plurality of distortion class value pairs based on the raw image data;
selection circuitry to select a distortion class value pair of the plurality distortion class value pairs based on a respective level of distortion introduced to the raw image data by application of respective ones of the plurality of distortion class value pairs and the objective video quality metric; and
image transformation circuitry to apply the selected distortion class value pair to the raw image data to generate display image data.

16. The electronic device of claim 15, further including:
Hue/Saturation/Value (HSV) circuitry to generate an HSV value set based on the raw image data;
feature extraction circuitry to generate a first plurality of feature values based on features in the raw image data; and
value extraction circuitry to generate a second plurality of feature values using "V" values included in the HSV value set, and
wherein data obtained from the raw image data provided to the artificial intelligence circuitry includes the first plurality of feature values based on features present in the raw image data and the second plurality of feature values using "V" values included in the HSV value set.

17. The electronic device of claim 16, wherein the feature extraction circuitry executes a convolution neural network (CNN).

18. The electronic device of claim 17, wherein the convolutional neural network (CNN) includes at least one layer of a trained VGG16 convolutional neural network (CNN).

19. The electronic device of claim 15, further including weighting circuitry to determine weight factors for respective ones of the plurality of distortion class value pairs to generate a plurality of weighted distortion class value pairs.

* * * * *